United States Patent [19]

Utsunomiya et al.

[11] 4,131,643

[45] Dec. 26, 1978

[54] CATALYST FOR CONVERTING NITROGEN OXIDES AND METHOD FOR CONVERTING NITROGEN OXIDES IN EXHAUST GASES BY USING SAID CATALYST

[75] Inventors: Kei Utsunomiya, Kobe; Kazuya Soga, Akashi; Katsunori Shimasaki, Kobe; Yutaka Mito, Kobe; Mamoru Oaki, Kobe; Shigeru Haseba, Kobe; Hiroetu Miki, Akashi; Michiko Masaki, Kobe, all of Japan

[73] Assignee: Kobe Steel Limited, Kobe, Japan

[21] Appl. No.: 833,498

[22] Filed: Sep. 15, 1977

Related U.S. Application Data

[62] Division of Ser. No. 710,330, Jul. 30, 1976, abandoned.

[30] Foreign Application Priority Data

Sep. 5, 1975 [JP] Japan .............................. 50/108179

[51] Int. Cl.$^2$ .............................................. B01D 53/00

[52] U.S. Cl. ................................ 423/239; 423/213.2; 252/461; 252/464

[58] Field of Search ........................... 423/213.2, 239; 252/461, 464, 467

[56] References Cited

U.S. PATENT DOCUMENTS

| 3,900,428 | 8/1975 | Mai et al. ........................... 423/213.5 |
| 4,010,238 | 3/1977 | Shiraishi et al. .................. 423/239 A |

OTHER PUBLICATIONS

"Chemical Abstracts" vol. 80, Mar. 1974, p. 41321a.

*Primary Examiner*—G. O. Peters
*Attorney, Agent, or Firm*—Oblon, Fisher, Spivak, McClelland & Maier

[57] ABSTRACT

A catalyst for catalytically reducing nitrogen oxides present in an exhaust gas in the presence of a reducing gas to convert said nitrogen oxides to harmless substances, which comprises a mixture consisting essentially of the oxides of V and Nb.

19 Claims, 8 Drawing Figures

CATALYST FOR CONVERTING NITROGEN OXIDES AND METHOD FOR CONVERTING NITROGEN OXIDES IN EXHAUST GASES BY USING SAID CATALYST

This is a division, of application Ser. No. 710,330, filed July 30, 1976, now abandoned.

BACKGROUND OF THE INVENTION

1. Field of the Invention

The present invention relates to a catalyst useful for catalytically reducing nitrogen oxides present in the combustion exhaust gas discharged from a calcination furnace, a coking furnace or a boiler or an exhaust gas from a nitric acid production plant in the present of a reducing gas such as ammonia to convert the nitrogen oxides to harmless substances, and to a method for converting these nitrogen oxides by reduction to nonharmful products over the catalyst.

2. Description of the Prior Art

The recent rapid progress of heavy chemical industries has been accompanied by undesirable problems such as air pollution caused by the accelerated evolution of nitrogen oxides. Thus, an urgent solution to the problem of nitrogen oxides evolution is desired, especially in large cities and in the vicinities of industrial areas. Under these circumstances, various methods for removing nitrogen oxides or reducing the contents of nitrogen oxides in waste gases have been proposed. Among these proposals is the so-called dry-type selective catalytic reduction method which comprises selectively reducing nitrogen oxides to harmless nitrogen in the presence of a reducing gas such as ammonia. This method is advantageous from several viewpoints. For example, a high conversion of nitrogen oxides can be obtained and the cost is much lower than the wet-type method. This method also has the advantage over the wet-type method in that such post treatments as the treatment of the waste water by-product obtained from the treatment of the waste gas, and the like need not be conducted. Moreover, process maintenance can be very easily achieved. By virtue of these advantages, this method is a practical industrial method. However, the method has the disadvantage in that the reaction temperature of the exhaust gas treatment must be as high as about 400° C, and when this method is used in the treatment of the low-temperature exhaust gas discharged from a coking furnace, a calcination furnace or the like, it is necessary to heat the exhaust gas. If this is not done, then excessive portions of the reducing gas such as ammonia added to the waste gas are discharged undecomposed into the atmosphere. Therefore, this relatively desirable method possesses certain problems which must be solved.

Catalysts comprising an oxide of V, Cu or the like supported on a porous carrier have been previously used for the conversion of nitrogen oxides, to other gaseous products, but catalysts of these types have various deficiencies. For example, the activity of these catalyst is low at low temperatures and excessive portions of the reducing gas added to the exhaust gas to reduce the nitrogen oxides are discharged into the atmosphere without being reacted with the nitrogen oxides. Moreover, it is difficult to reduce the nitrogen oxides with high efficiency over these catalysts.

SUMMARY OF THE INVENTION

The present invention has been completed with the objective of overcoming the foregoing disadvantages and problems involved with the conventional methods of treating $NO_x$ containing gases.

Accordingly, a primary object of the present invention is to provide a method for catalytically reducing nitrogen oxides present in an exhaust gas with a reducing gas and converting the $NO_x$ components to harmless substances and a catalyst for use in achieving this objective.

Another object of the present invention is to provide a catalyst for the conversion of nitrogen oxides which is not degraded by other components present in the exhaust gas such as sulfurous acid gas and water and which has excellent durability.

Yet another object of the present invention is to provide a catalyst to which exhaust gases can be subjected for the conversion of nitrogen oxides over a broad temperature range.

Still another object of the present invention is to provide a catalyst to which exhaust gases can be exposed which contain large quantities of dust for the conversion of nitrogen oxides.

Briefly, these objects and other objects of the invention can be attained with respect to the first aspect of the present invention by a method comprising contacting an exhaust gas containing nitrogen oxides with a catalyst consisting essentially of the oxides of V and Nb or the oxides of V, Nb and at least one element selected from the group consisting of Cu, Ti, Fe, Cr, W, Mo and Ni in the presence of a reducing gas such as ammonia at a temperature of 200° to 500° C and a space velocity of 2,000 to 100,000 $hr^{-1}$.

The second aspect of the present invention is a limited form of the method of the first aspect in which the catalyst consists essentially of V, Nb and Ti, wherein the atomic ratio of Nb to V is 0.1:0.14 and the atomic ratio of Ti to V is 0.4 to 0.8.

The third aspect of the present invention is also a limited form of the method as set forth in the first aspect, wherein the ratio of the atomic number of Nb to the atom number of V, and the ratio of the combined atomic numbers of Nb and another element to the atomic number of V are in the range of from 0.1 to 5, and wherein the ratio of the atomic number of an element other than V and Nb to the atomic number of Nb is in the range of from 0.25 to 99.

The fourth aspect of the present invention is also a limited form of the method as set forth in the first aspect, wherein the catalyst components are supported on a carrier in the form of beds, column structures, Raschig rings or plates, or a continuously porous carrier such as a honeycomb in an amount of 0.1 to 20% by weight, preferably 1 to 10% by weight, based on the carrier.

DETAILED DESCRIPTION OF THE PREFERRED EMBODIMENTS

In the method of the present invention an exhaust gas containing nitrogen oxides is contacted with a catalyst in the presence of a reducing gas such as ammonia to catalytically reduce the nitrogen oxides in the exhaust gas and to convert the NO$_x$ components to harmless substances. As active constituents for the catalyst invention various elements belonging to groups V, VI an VIII of the Periodic Table were considered. Research was conducted into the search for effective catalyst components capable of exhibiting high activity over a broad temperature range while maintaining the decomposing activity of the reducing agent such as ammonia at a high level over a broad temperature range. As a result of the study, it has been found that a catalyst consisting essentially of the oxides of V and Nb or the oxides of V, Nb and at least one element selected from the group consisting of Cu, Cr, W, Mo, Ti, Fe and Ni achieves the above requirements sufficiently. Denitration studies involving a catalytic reduction reaction were conducted using this catalyst based on the above finding.

The present invention will now be described in detail with reference to both the catalyst and the method for converting nitrogen oxides using the catalyst.

In the catalyst of the present invention, suitable vanadium sources, includes such vanadium compounds as ammonium metavanadate, vanadyl oxalate, vanadium oxychloride and vanadium oxides. Suitable niobium and titanium sources include niobium and titanium compounds such as the pentachlorides and tetrachlorides of niobium and titanium, niobic acid, titanic acid, niobates, titanates, titanium sulfate and oxides of niobium and titanium. Suitable copper, iron, nickel and chromium starting materials include such effective compounds of these metals as the oxides, nitrates, sulfates, chlorides and organic acid salts. Suitable starting substances for molybdenum and tungsten, include acid salts such as ammonium molybdate and ammonium tungstate, and oxides of molybdenum and tungsten.

The catalysts can be prepared from the foregoing starting substances without using a carrier, but it is preferred that the catalysts be prepared by supporting the catalyst components on a porous carrier such as active alumina, titania, zirconia, thoria, silica-alumina, magnesia, silica, silicon carbide, clay or a mixture of two or more of these supports, or by mixing the active catalyst components with a powder of at least one of the porous carriers and molding the mixture. In this case, the effective surface area of the catalyst is increased in and the mechanical strength is improved.

Figure 1:
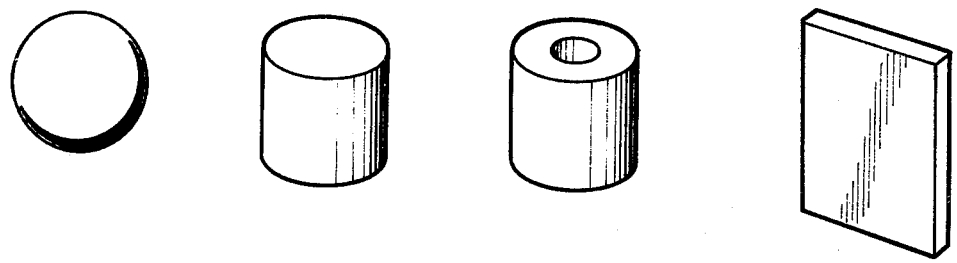
FIG. 1 is a diagram illustrating the shape of a pellet type catalyst of the present invention.
Figure 2:
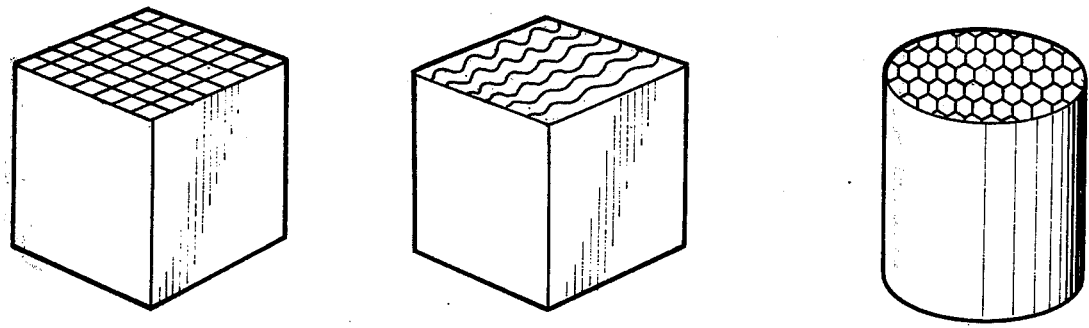
FIG. 2 is a diagram illustrating the shape of a continuously porous catalyst such as a honeycomb shaped catalyst of the present invention.

The carrier can be in the form of beads, column shaped, Raschig rings or plates as shown in FIG. 1. When an exhaust gas containing large quantities of dust, such as the exhaust gas discharged from a coking furnace or calcination furnace, is directly treated without subjecting the gas to preliminary dust precipitation, dust is deposited on the catalyst layer which causes degradation of the catalyst and clogging of the catalyst layer. This results in an increased pressure loss. In this cae, the use of continuously porous carrier such as those shown in FIG. 2 is recommended. When a continuously porous catalyst is employed, the pressure loss is very small and therefore, the exhaust gas can be treated at a very high space velocity. The cross sections of the continuously porous carriers have various shapes which include hexagonal shapes, squares, triangles or other types of polygons, or circular or sine wave shape, spidery shape or spiral shape. The continuously porous carriers possess voids or pores of a porosity of about 50 to about 70%.

The continuously porous carriers may be prepared by coating and sintering a powder of silica, alumina, titania, zirconia, thoria or the like on a metal substrate. This preparative procedure is not the best, because there is insufficient adhesion between the coating and substrate of the carrier and therefore the coating readily peels from the substrate, and because there is a great difference in the thermal expansion coefficients between the coating and substrate thus resulting in inferior resistance to heat. In view of the foregoing, it is preferred to use a continuously porous carrier prepared by coating a mixture of a powder of silica, alumina, titania, zirconia, thoria or silica-alumina with a suitable binder on a ceramic substrate such as cordierite and sintering the coating. In order to obtain the large surface areas required of carriers, a coating composed mainly of alumina is especially preferred. It is also possible to coat titania, thoria, silica or zirconia on a coating composed mainly of alumina or a mixture of alumina with at least one member selected from the group of silica, titania, zirconia and thoria on a substrate coated with a layer composed mainly of alumina.

An embodiment of the method of supporting the catalyst components on a support such as one of those mentioned above will now be described by reference to a catalyst of the V-Nb-Ti-Cu series.

Prescribed amounts of aqueous solutions of ammonium metavanadate, niobium pentachloride and titanium tetrachloride are dissolved in an aqueous solution of an organic acid such as oxalic acid, tartaric acid, citric acid or the like, and a carrier of the invention is immersed into the resulting solution. The carrier is then removed from solution, dehydrated, dried and then calcined. Then, the calcined carrier is immersed in an aqueous solution of copper nitrate and thereafter, post treated in the manner indicated above. By this method a supported catalyst can easily be prepared and the catalyst components are supported on the carrier in the form of the oxides. Alternatively, if suitable starting substances are selected, the four components can be deposited simultaneously on the carrier. Components other than those mentioned above can be deposited on the carrier according to similar methods. If a catalyst of sufficient activity is to be obtained, it is most preferred that the calcination be carried out at 200° to 600° C. It also is preferred that the active components of the catalyst be supported in an amount of 0.1 to 20% by weight, especially 1 to 15% by weight, based on the carrier.

The composition of the respective catalyst components in the catalyst of the present invention will now be described by reference to the ratio of the atom numbers.

In case of a catalyst of the V-Nb series, the ratio of the atom number of Nb to the atom number of V should be in the range of from 0.1 to 5, and in the case of a catalyst of the V-Nb-X series, herein X denotes at least one element selected from the group consisting of Ti, Cu, Cr, W, Mo, Fe and Ni, the ratio of the total atom number of Nb and the element X should be in the range of from 0.1 to 5 and the ratio of the atom number of an element X, other than V and Nb, to the atom number of Nb should be in the range of from 0.25 to 99. If the above requirements are not satisfied, sufficient catalyst activity cannot be obtained.

If the ratio of the atom number of Nb or the atom number of Nb and another element to the atom number of V is less than 0.1, no particular effects can be obtained by adding Nb or Nb and another element to the catalyst and the low temperature activity of the catalyst and the decomposing activity of the catalyst in conjunction with the ammonia reducing agent are not significantly improved. If the ratio is greater than 5, the decomposing activity of the catalyst with the ammonia reducing agent is increased but the activity-manifesting temperature range is narrowed and the catalyst activity in the high temperature range is reduced. If the ratio of the atom number of the element other than V and Nb to the atom number of Nb, disadvantages as mentioned above are similarly brought about.

In the instances when the catalyst consists essentially of the oxides of V, Nb and Ti, the atomic ratio of Nb to V can range from 0.01 to 0.14 and the atomic ratio of Ti to V can range from 0.4 to 0.8. This blend of components results in a high ratio of NO conversion and good catalyst durability.

Figure 3:
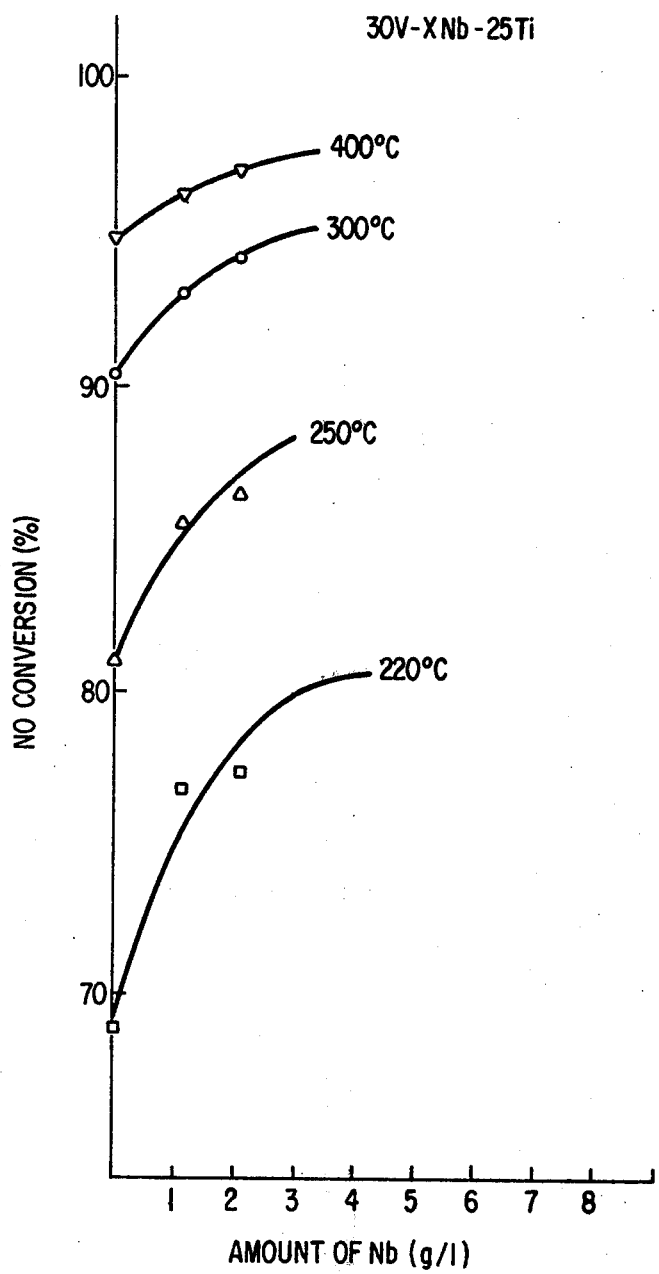
FIG. 3 is a graph showing the conversion of $NO_x$ by catalytic reduction at temperatures of 220°, 250°, 300° and 400° C in the presence of a catalyst of the 30V-XNb-25Ti series according to the present invention as a function of changing Nb content.

FIG. 3 is a graph showing the conversion of NO obtained when the catalytic reduction is conducted a temperatures of 200° to 400° C, over a series of catalysts of the formula 30V-XNb-25Ti, wherein the coefficient before each element symbol denotes the amount of the element in g per l of the carrier, and wherein the amount of the niobium content changes. From the results shown in FIG. 3, it can be readily understood that even if very small amounts of Nb and a third element are added, sufficient effects can be obtained.

The catalyst prepared in the manner indicated is disposed in the flue through which an exhaust gas is discharged from a combustion apparatus. The exhaust gas is mixed with a reducing gas such as ammonia prior to contact with the catalyst and the gas mixture is contacted with the catalyst at a reaction temperature of 200° to 500° C and a space velocity of 2000 to 100,000 $hr^{-1}$, thus converting nitrogen oxides to harmless substances. When the method of the present invention is employed, a very high $NO_x$ conversion can be attained even at such low temperatures as 200° to 300° C, or at such high space velocities of 10,000 to 20,000 or higher. Such reaction conditions cannot be practically used in the conventional conversion methods.

As is evident from the foregoing discussion, by using the method of the present invention, it is possible to convert $NO_x$ in waste gases to harmless substances effectively at low temperatures and at high space velocities. This results in various advantages such as a reduction in the consumption of heat energy, reduced pressure losses and a prevention of degradation of the catalyst. Accordingly, the method of the present invention is very valuable as an industrial method for converting $NO_x$ in exhaust gases to harmless products.

Having generally described this invention, a further understanding can be obtained by reference to certain specific examples which are provided herein for purposes of illustration only and are not intended to be limiting unless otherwise specified.

EXAMPLE 1

To 1 l. of distilled water was added 470g of oxalic acid and the oxalic acid was dissolved in the water by heating. Then, 170 g of ammonium metavanadate, 276 g of an aqueous solution of titanium tetrachloride (containing about 70 g of titanium) and 93 g of niobium pentachloride were added to a stirred solution to dissolve them in the solution completely. Then, 500 ml of active alumina beads were immersed in the resulting solution for 30 minutes. The alumina was removed from the solution, dehydrated, dried at 110° C for 1 hour and calcined at 400° C for 1 hour in an electric furnace in the presence of a flow of air, thereby resulting in a catalyst consisting essentially of the oxides of vanadium, niobium and titanium deposited on the alumina carrier. The prepared catalyst was then immersed in an aqueous solution of copper nitrate (containing 74 g of copper nitrate of 1 l. of water) for 30 minutes, and the above described post treatment steps were conducted whereby a catalyst having a composition of one atom of titanium, 0.3 atom of niobium and 0.2 atom of copper per atom of vanadium was obtained.

This catalyst was used for the treatment of a synthetic laboratory gas and an exhaust gas discharged from a coking furnace (at a rate of 5 $Nm^3$/hr). Reaction conditions and experimental results are shown in Table 1. The results of the analysis of the reaction product obtained in the experiment in which the synthetic gas was used as shown in Table 2.

The results of the activity tests performed with a vanadium-niobium catalyst prepared in the same manner as described aove are also shown in Table 1.

Further, compositions of 10 catalysts prepared in the same manner as described above and the conditions and results of the synthetic gas test made on these gases are shown in Table 3.

TABLE 1

| Composition of Catalyst | Composition of Starting Gas | | | | | | Space Velocity ($hr^{-1}$) | Reaction Temperature (°C) | $NH_3$ (ppm)/ NO (ppm) | No Conversion (%) | $NH_3$ Conversion (%) | Remarks |
|---|---|---|---|---|---|---|---|---|---|---|---|---|
| | NO (ppm) | $NH_3$ (ppm) | $SO_2$ (ppm) | $H_2O$ (%) | $O_2$ (%) | $N_2$ (%) | | | | | | |
| V1-Nb0.3 | 244 | 325 | 44 | 10.7 | 7.3 | balance | 10,000 | 250 | 1.33 | 90.0 | 70.0 | synthetic gas |

TABLE 1-continued

| Composition of Catalyst | Composition of Starting Gas | | | | | | Space Velocity (hr⁻¹) | Reaction Temperature (° C) | NH₃ (ppm)/ NO (ppm) | No Conversion (%) | NH₃ Conversion (%) | Remarks |
|---|---|---|---|---|---|---|---|---|---|---|---|---|
| | NO (ppm) | NH₃ (ppm) | SO₂ (ppm) | H₂O (%) | O₂ (%) | N₂ (%) | | | | | | |
| 1V<br>\|<br>0.3Nb<br>\|<br>1Ti<br>\|<br>0.2Cu | 238 | 281 | 45 | 8.0 | 8.0 | balance | 10,000 | 230 | 1.18 | 91.0 | 92.1 | " |
| | 238 | 281 | 45 | 8.0 | 8.0 | balance | 10,000 | 300 | 1.18 | 97.2 | 95.4 | " |
| | 274 | 342 | 43 | 10.5 | 7.2 | balance | 10,000 | 230 | 1.25 | 95.1 | 90.8 | " |
| | ~298 | 420 | 23 | — | 4~5 | — | 10,000 | 240 | 1.41 | 92.1 | 80.2 | coking furnace exhaust gas, initial stage |
| | ~258 | 385 | 30 | — | 4~5 | — | 10,000 | 230 | 1.49 | 90.3 | 85.3 | coking furnace, exhaust gas, hours after start of reaction |

TABLE 2

| Catalyst Composition | Composition of Starting Gas | | | Outlet Gas Composition | | | | Conversion (%) to N₂ | Temperature (° C) |
|---|---|---|---|---|---|---|---|---|---|
| | NO | NH₃ | He+H₂O+O₂ | NO (ppm) | NH₃ (ppm) | 3N₂ (ppm) | He+H₂O+O₂ | | |
| 1V<br>\|<br>0.3Nb<br>\|<br>1Ti<br>\|<br>0.2Cu | 3959 | 6022 | balance | 146 | 2480 | 7326 | balance | 99.5 | 250 |
| | 4862 | 7758 | balance | 36 | 2908 | 9653 | balance | 99.8 | 300 |

TABLE 3

| Sample No. | Composition of Catalyst | Composition of Starting Gas | | | | | | Space Velocity (hr-1) | Reaction Temperature (° C) | No Conversion (%) | NH₃ Conversion (%) |
|---|---|---|---|---|---|---|---|---|---|---|---|
| | | NO (ppm) | NH₃ (ppm) | SO₂ (ppm) | H₂O (%) | O₂ (%) | N₂ | | | | |
| 2 | V1-Nb0.2-Fe0.3-Cr1 | 258 | 363 | 44 | 10.7 | 7.2 | balance | 10,000 | 250 | 94.3 | 83.0 |
| 3 | V1-Nb0.8-Mo0.2-Cu0.4 | 243 | 343 | 43 | 10.5 | 7.2 | balance | 10,000 | 250 | 97.1 | 85.6 |
| 4 | V1-Nb0.1-Ti1.2-Cu0.3 | 273 | 345 | 43 | 10.5 | 7.2 | balance | 10,400 | 230 | 94.0 | 88.2 |
| 5 | V1-Nb1-Ti0.2-Ni0.5 | 245 | 351 | 43 | 10.5 | 7.2 | balance | 10,000 | 250 | 93.8 | 80.3 |
| 6 | V1-Nb0.5-W0.2-Cr0.8 | 240 | 330 | 50 | 10.5 | 7.2 | balance | 10,000 | 250 | 92.0 | 81.1 |
| 7 | V1-Nb0.5-W0.2 | 243 | 313 | 44 | 10.7 | 7.3 | balance | 10,000 | 300 | 97.5 | 92.8 |
| 8 | V1-Nb0.5-S-Cr0.8 | 238 | 335 | 43 | 10.5 | 7.2 | balance | 10,500 | 300 | 97.8 | 91.7 |
| 9 | V1-Nb0.4-Mo0.4 | 242 | 339 | 43 | 10.5 | 7.2 | balance | 11,000 | 300 | 98.5 | 92.3 |
| 10 | V1-Nb0.2-Ti1.2 | 241 | 314 | 44 | 10.5 | 7.2 | balance | 10,000 | 300 | 97.0 | 90.9 |
| 11 | V1-Nb0.1-Fe0.6 | 240 | 288 | 44 | 10.5 | 7.2 | balance | 10,000 | 300 | 96.3 | 92.0 |

EXAMPLE 2

Figure 4:
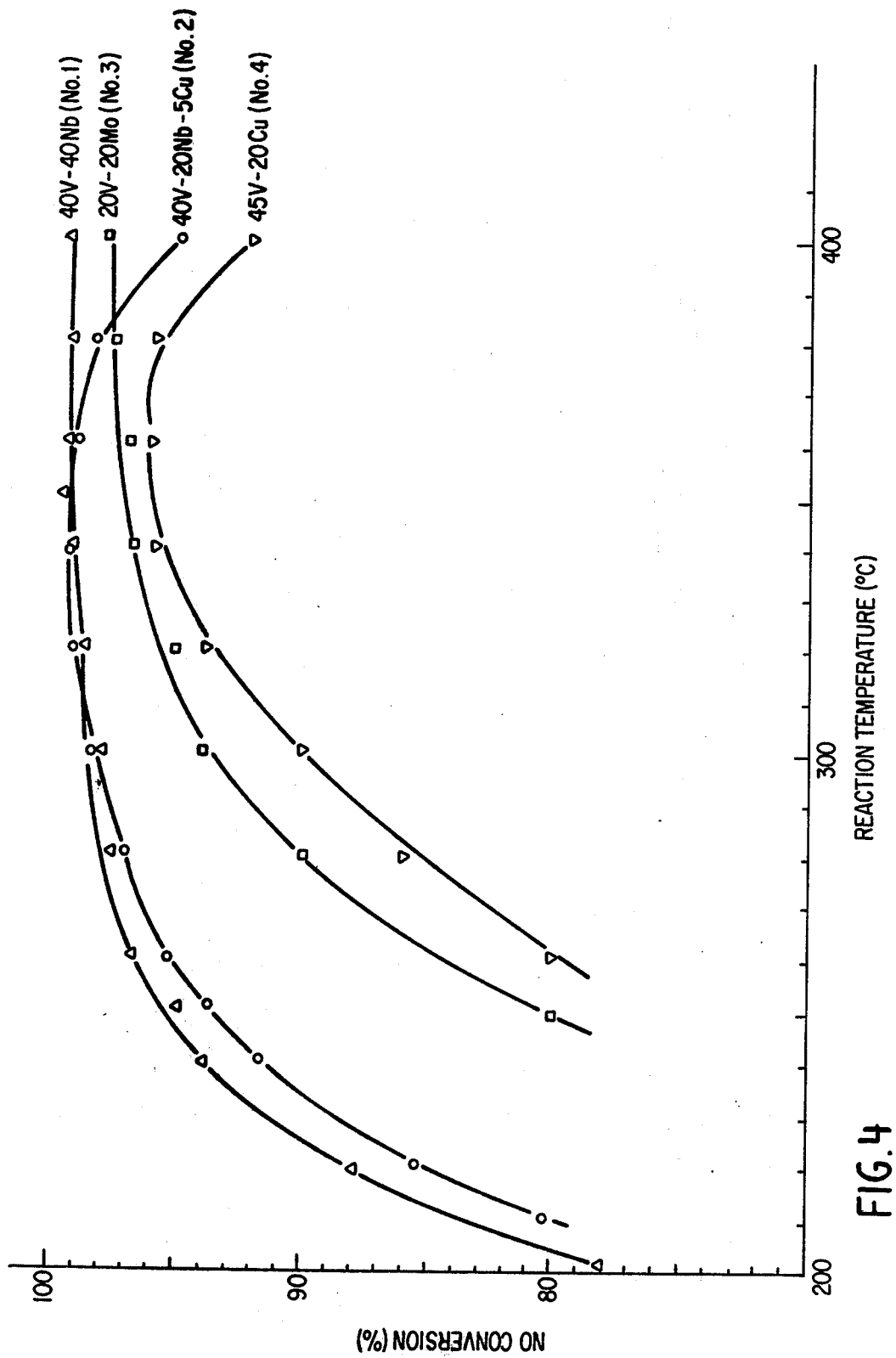
FIG. 4 is a graph showing NO$_x$ conversion versus the temperature observed when the catalytic conversion was conducted in the presence of the catalyst of the present invention and when the reaction was conducted over a conventional catalyst.

An active alumina carrier was immersed in an oxalic acid solution containing V, Nb, Cu as active components and the like for 30 minutes. The separated, impregnated carrier was dried and calcined for 1 hour at 400° C. Then, the carrier was immersed in the above solution again, and dried and calcined. A synthetic gas comprising 240 ppm of NO, 338 ppm of NH₃, 7.2% of O₂, 10.5% of H₂O and 43 ppm of SO₂ with the balance N₂ was contacted with the prepared catalyst at a space velocity of 10,000 Hr⁻. The relationship between the conversion of NO and the reaction temperature which was observed in this experiment is shown in FIG. 4. The number before each catalyst element symbol denotes the amount of the element in g per 1 of the catalyst.

From the results shown in FIG. 4, it can be readily understood that the catalysts of the present invention (samples Nos. 1 and 2) were superior to the conventional catalysts (samples Nos. 3 and 4) with respect to the reducing activity over the total temperature range, especially over the low temperature range.

EXAMPLE 3

In distilled water were dissolved 470 g of oxalic acid, 170 g of ammonium metavanadate, 93 g of niobium pentachloride and 276 g of a slution of titanic acid to form 1 l. of a solution.

A mixture of alumina and a binder was coated in an amount of about 30% on a honeycomb type ceramic substrate, and the coated substrate was immersed in the aqueous solution containing the catalyst components for 30 minutes. Then, the ceramic substrate was removed from the aqueous solution, dehydrated, dried at 110° C for 1 hour and calcined at 500° C for 1 hour in an electric furnace while passing a flow of air into the furnace, whereby a honeycomb type catalyst having vanadium, niobium and titanium oxides supported thereon was obtained.

Figure 5:
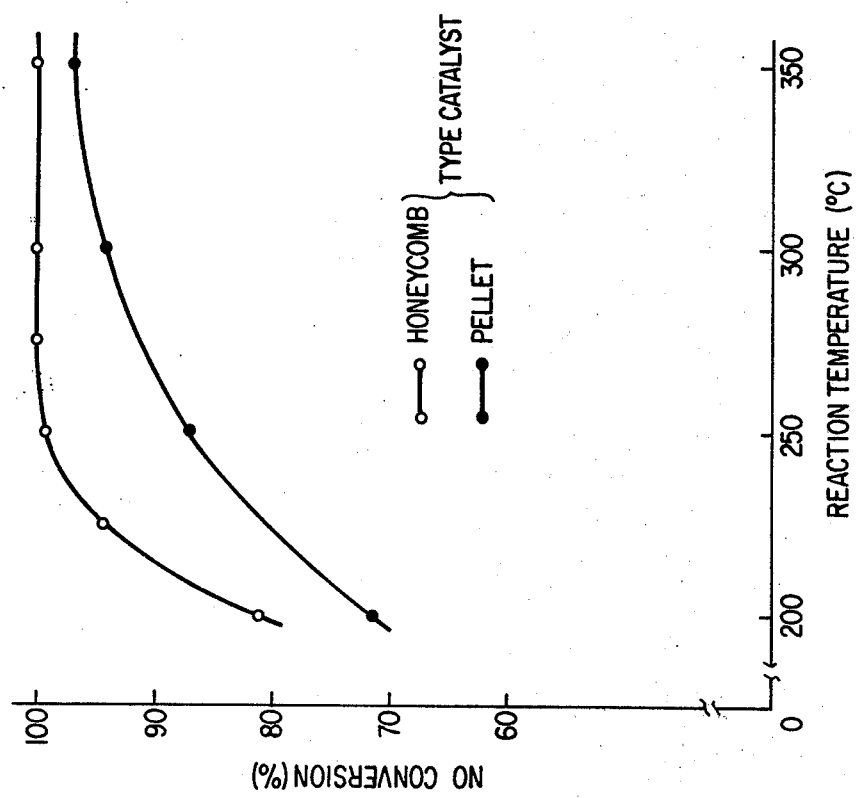
FIG. 5 is a graph showing the relationship between NO$_x$ conversion and reaction temperature when the catalytic reduction was conducted in the presence of a honeycomb type catalyst and a pellet type catalyst of the present invention.

A mixed gas comprising 250 ppm of NO, 375 ppm of $NH_3$, 4% of $O_2$ and 7% of $H_2O$ with the balance being $N_2$ was catalytically reduced at a space velocity of 10,000 $hr^{-1}$ in the presence of the prepared catalyst at various reaction temperatures, and the $NO_x$ conversion was determined as shown in FIG. 5.

Separately, in the same manner as described above, 500 ml of a bead-like porous alumina carrier was immersed in the aqueous solution and was subjected to the described post treatment steps, whereby a pellet-type catalyst having vanadium, niobium and titanium oxides supported thereon was obtained. (The amount of each catalyst component supported was twice as large as the amount in the above honeycomb type catalyst.) By using the prepared catalyst, a mixed gas was treated in the same manner as described above, and the $NO_x$ conversion was determined and the results obtained are shown in FIG. 5.

As can be readily understood from the results shown in FIG. 5, when the honeycomb type catalyst was used, a much higher $NO_x$ conversion was obtained than in the case of the pellet type catalyst, if the comparison is made at the same space velocity. The difference was greater in the low temperature range.

The pressure loss in the case of the honeycomb type catalyst was about 1/10 of the pressure loss in the case of the pellet type catalyst.

EXAMPLE 4

Figure 6:
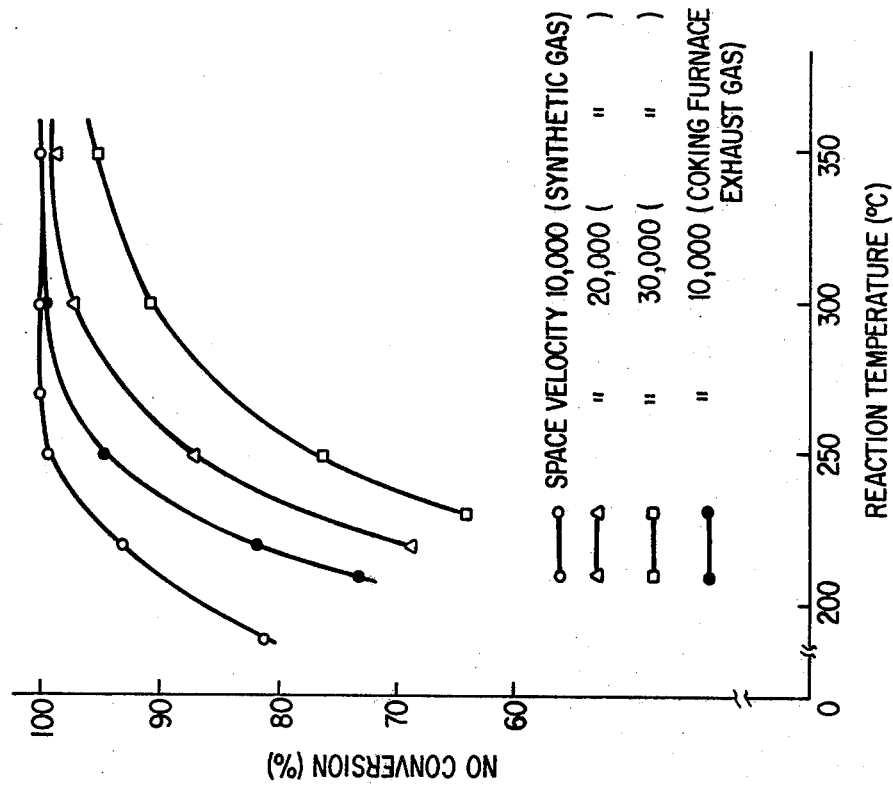
FIG. 6 is a graph showing the relationship of NO$_x$ conversion versus reaction temperature when the catalyst reduction was conducted in the presence of a honeycomb type catalyst of the present invention at various space velocities.

By using a honeycomb type catalyst prepared in the same manner as described in Example 3, a synthetic mixed gas having the same composition as described in Example 3 was treated at a space velocity of 10,000, 20,000 or 30,000 $hr^{-1}$ under changing reaction temperature conditions, and the $NO_x$ conversion was determined and the results obtained are shown in FIG. 6.

As will be apparent from these results, when the honeycomb type catalyst of the present invention was employed, an $NO_x$ conversion of at least 90% was obtained at a space velocity of 30,000 $hr^{-1}$ if the reaction temperature was 300° C or higher. The pressure loss in the case of the honeycomb type catalyst was about 1/15 of the pressure loss found when a pellet type catalyst prepared in the same manner as described above was used.

EXAMPLE 5

Using a honeycomb type catalyst prepared in the same manner as described in Example 3, a coking furnace exhaust gas comprising up to 350 ppm of NO, 2 to 8% of $O_2$ and up to 200 ppm of $SO_2$ with the balance being $CO_2$, $H_2O$ and $N_2$ was catalytically reduced at a space velocity of 10,000 $hr^{-1}$ and an $NO/NH_3$ ratio of 1.5 under changing reaction temperature conditions. The $NO_x$ conversion was determined and the results are shown in FIG. 6.

The coking furnace exhaust gas was similarly treated at 250° C for 500 hours to evaluate the durability of the catalyst. No increase in pressure loss was observed.

EXAMPLE 6

Using a pellet type catalyst of the 40V-1.7Nb-20Ti series prepared according to the method described in Example 1, a coking furnace exhaust gas comprising up to 350 ppm of NO, up to 200 ppm of $SO_2$ and 2 to 8% of $O_2$ with the balance being $N_2$ was catalytically reduced in the presence of $NH_3$ which was incorporated in the exhaust gas at an $NH_3/NO$ ratio of 1.5 at a space velocity of 5,000 $hr^{-1}$ and a temperature of 220° or 250° C. The relationship between the NO conversion and the reaction time obtained in this experiment is shown in FIG. 7.

Figure 7:
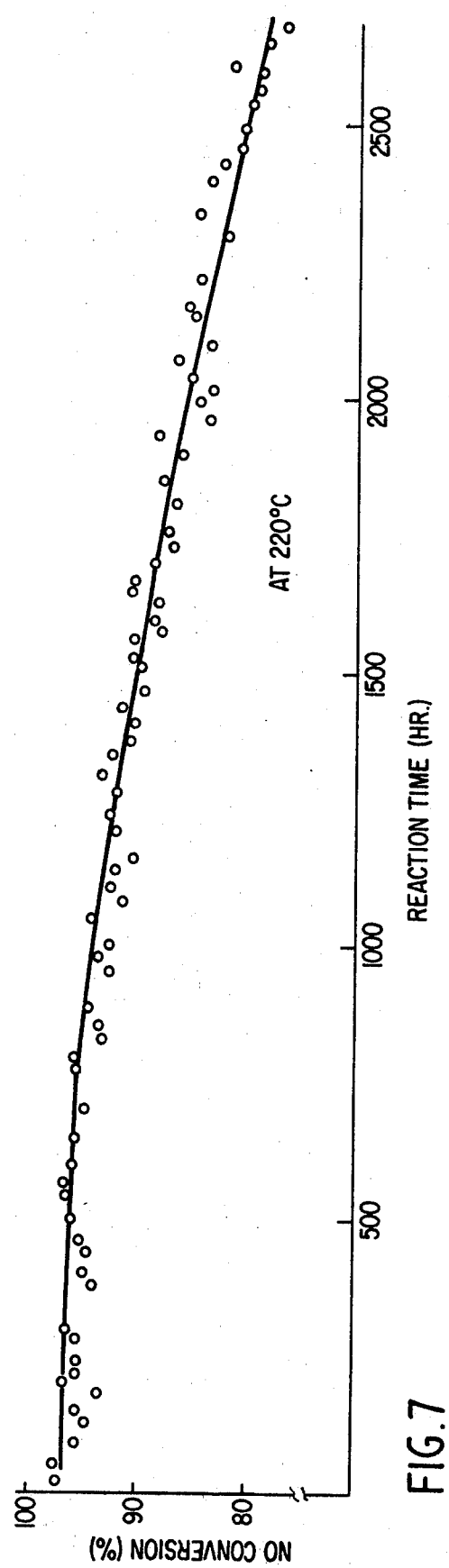
FIG. 7 is a graph showing the relationship between the NO$_x$ conversion and the reaction time when the catalyst reduction was conducted in the presence of a pellet type catalyst of the present invention.
Figure 8:
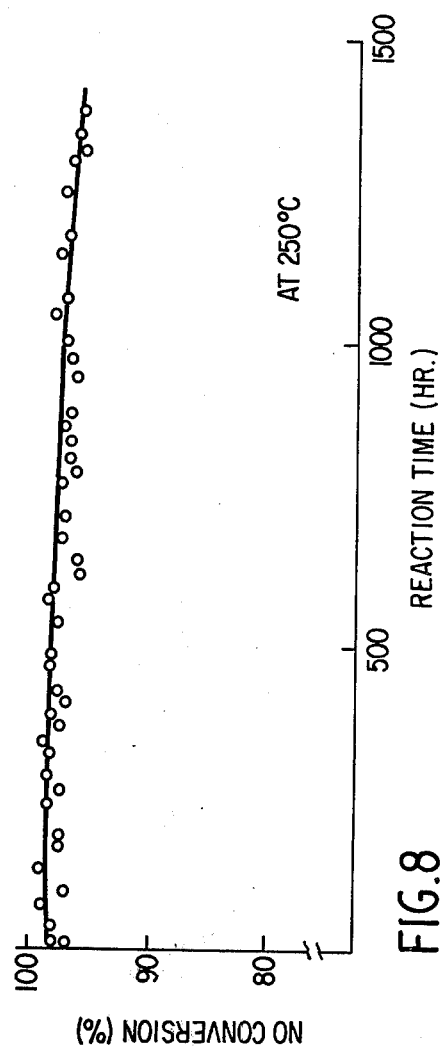
FIG. 8 illustrates the relation between NO$_x$ conversion and reaction time at 250° C for a catalyst within the scope of the present invention.

From FIG. 7, it is readily apparent that the activity of the catalyst of the present invention does not decrease even if it is used for a long time, and a high NO conversion could be maintained when the reaction was continued for a long time.

What is claimed as new and intended to be secured by Letters Patent is:

1. A method for converting nitrogen oxides present in exhaust gases to harmless substances, which comprises:
   contacting an exhaust containing nitrogen oxides in the presence of ammonia as a reducing agent at a temperature of 200° to 500° C, and a space velocity of 2,000 to 10,000 $hr^1$ with a catalyst consisting essentially of the oxides of V and Nb.

2. The method of claim 1, wheren the ratio of the atom number of Nb to the atom number of V is in the range of from 0.1 to 5.0.

3. A method for converting nitrogen oxides present in exhaust gases to harmless substances, which comprises:
   contacting an exhaust gas containing nitrogen oxides in the presence of ammonia as a reducing agent at temperature of 200° to 500° C and a space velocity of 2,000 to 100,000 $hr^{-1}$ with a catalyst consisting essentially of the oxides of V, Nb and at least one element selected from the group consisting of Cu, Ti, Fe, Cr, W, Mo and Ni.

4. The method of claim 3, wherein the ratio of the total atom number of Nb and said element to the atom of V is in the range of from 0.1 to 5.0.

5. A method for converting nitrogen oxides present in exhaust gases to harmless substances, which comprises:
   contacting an exhaust gas containing nitrogen oxides in the presence of ammonia as a reducing agent at a temperature of 200° to 500° C and a space velocity of 2,000 to 100,000 $hr^{-1}$ with a catalyst consisting essentially of the oxides of V, Nb and Ti.

6. The method of claim 3, wherein the ratio of the atom number of said element to the atom number of Nb is in the range of from 0.25 to 99.

7. The method of claim 5, wherein the atomic ratio of Nb to V is from 0.01 to 0.14 and the atomic ratio of Ti to V is from 0.4 to 0.8.

8. The method of claim 1, wherein said catalyst is supported on a carrier.

9. The method of claim 3, wherein said catalyst is supported on a carrier.

10. The method of claim 5, wherein said catalyst is supported on a carrier.

11. The method of claim 1, wherein said carrier is formed in a shape of beads, columns, Rashing rings, plates or of a honeycomb structure.

12. The method of claim 3, wherein said carrier is formed in a shape of beads, columns, Rashing rings, plates or of a honeycomb structure.

13. The method of claim 5, wherein said carrier is formed in a shape of beads, columns, Rashing rings, plates or of a honeycomb structure.

14. The method of claim 11, wherein said catalyst components are supported in an amount of 0.1 to 20% by weight based on said carrier.

15. The method of claim 12, wherein said catalyst components are supported in an amount of 0.1 to 20% by weight based on said carrier.

16. The method of claim 13, wherein said catalyst components are supported in an amount of 0.1 to 20% by weight based on said carrier.

17. The method of claim 14, wherein the catalyst components are supported in an amount of 1 to 10% by weight based on the carrier.

18. The method of claim 15, wherein the catalyst components are supported in an amount of 1 to 10% by weight based on the carrier.

19. The method of claim 16, wherein the catalyst components are supported in an amount of 1 to 10% by weight based on the carrier.

* * * * *